(12) United States Patent
Pavelka et al.

(10) Patent No.: US 6,572,977 B1
(45) Date of Patent: *Jun. 3, 2003

(54) FLUORESCENT RED COMPOSITION AND ARTICLES MADE THEREFROM

(75) Inventors: Lee A. Pavelka, Cottage Grove, MN (US); David L. Bergeson, Mendota Heights, MN (US); Eugene H. Carlson, Apple Valley, MN (US); Deana A. Klein, Maplewood, MN (US); Susan T. Chrysler, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 35 days.

This patent is subject to a terminal disclaimer.

(21) Appl. No.: 09/659,968

(22) Filed: Sep. 12, 2000

(51) Int. Cl.[7] .................................. C09B 5/62
(52) U.S. Cl. ................ 428/500; 428/522; 428/195; 428/336; 156/246; 156/247; 427/384; 427/393.5; 523/172; 524/227; 524/229
(58) Field of Search ................ 428/522, 500, 428/195, 334; 524/227, 229; 523/172; 156/246, 247; 427/384, 393.5

(56) References Cited

U.S. PATENT DOCUMENTS

| | | | |
|---|---|---|---|
| 2,407,680 A | 9/1946 | Palmquist | 88/82 |
| 3,190,178 A | 6/1965 | McKenzie | 88/82 |
| 3,684,348 A | 8/1972 | Rowland | 350/103 |
| 4,025,159 A | 5/1977 | McGrath | 350/105 |
| 4,511,210 A | 4/1985 | Tung et al. | 350/105 |
| 4,627,997 A | 12/1986 | Ide | 428/216 |
| 4,801,193 A | 1/1989 | Martin | 350/103 |
| 4,845,223 A | 7/1989 | Seybold et al. | 546/37 E |
| 4,895,428 A | 1/1990 | Nelson et al. | 350/103 |
| 4,896,943 A | 1/1990 | Tolliver et al. | 350/105 |
| 4,938,563 A | 7/1990 | Nelson et al. | 350/103 |
| 4,950,525 A | 8/1990 | Bailey | 428/164 |
| 5,028,504 A * | 7/1991 | Rule et al. | 430/59.1 |
| 5,064,272 A | 11/1991 | Bailey et al. | 359/541 |
| 5,066,098 A | 11/1991 | Kult et al. | 359/540 |
| 5,122,306 A * | 6/1992 | Van Moer et al. | 252/582 |
| 5,141,837 A | 8/1992 | Nguyen et al. | 430/135 |
| 5,272,562 A | 12/1993 | Coderre | 359/529 |
| 5,387,458 A | 2/1995 | Pavelka et al. | 428/141 |
| 5,470,502 A | 11/1995 | Hahn et al. | 252/301.35 |
| 5,674,622 A | 10/1997 | Burns et al. | 428/412 |
| 5,754,337 A | 5/1998 | Burns et al. | 359/515 |
| 5,920,429 A | 7/1999 | Burns et al. | 359/515 |
| 6,048,069 A | 4/2000 | Nagaoka et al. | 359/529 |
| 6,312,132 B1 * | 11/2001 | Pavelka et al. | 156/305 |

FOREIGN PATENT DOCUMENTS

| | | |
|---|---|---|
| DE | 289182 | 4/1991 |
| EP | 0 792 907 | 9/1997 |
| JP | 03234587 | 10/1991 |
| JP | 4-359942 | 12/1992 |
| WO | WO 96/36647 | 11/1996 |
| WO | WO 98/14802 | 4/1998 |
| WO | WO 98/28946 | 7/1998 |
| WO | WO 99/46616 | 9/1999 |

OTHER PUBLICATIONS

"Metrology of fluorescent retroreflective materials and its relationship to their daytime visibility", David M. Burns, Norbert L. Johnson, Analytica Chimica Acta 380 (1999) 211–226.

* cited by examiner

*Primary Examiner*—D. Lawrence Tarazano
(74) *Attorney, Agent, or Firm*—Carolyn A. Fischer (57) ABSTRACT

A fluorescent red composition providing a coating having chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8; articles comprising the composition or coating, and methods of making.

36 Claims, 4 Drawing Sheets

FLUORESCENT RED COMPOSITION AND ARTICLES MADE THEREFROM

FIELD OF THE INVENTION

The invention relates to fluorescent red compositions and fluorescent red articles having improved visibility and conspicuity.

BACKGROUND OF THE INVENTION

It is commonly known that fluorescent colors provide increased conspicuity for visual signaling under most lighting conditions, and particularly under low natural lighting conditions. These conditions occur at dusk and at sunrise and present a challenge for traffic sign manufacturers. If increased conspicuity of an article is desired, the article is often colored with fluorescent colorants. Fluorescent colors allow enhanced conspicuity because the visual contrast that the fluorescent colors create with the environment is greater than that of similar non-fluorescent articles. Fluorescent colored traffic signs are effective at increasing the conspicuity of the signs and, in turn, increase the likelihood of the signs being observed.

Certain conventions have evolved with respect to the color of traffic signs. In the United States, the Manual for Uniform Traffic Control Devices contains the color code for use on public roadways. For example, informational signs may be green or blue, general warning signs will be yellow, construction and maintenance warning signs are orange and stop signs are red. Motorists have become accustomed to these conventions and color purity is important to encourage the appropriate response. Although fluorescent red dyes are available, their chromaticity or color purity can vary from pink to orange in dyed articles and may not have a true red appearance.

In addition to color purity, it is important for highway signage to be visually conspicuous. As the brightness or luminance of a sign increases, the more visually obvious the sign is relative to its background. The luminance of a fluorescing article is the sum of its reflected and emitted light. The greater the contribution from emitted light to total luminescence the brighter the appearance of the fluorescing article. It is therefore desirable to avoid conditions that quench fluorescence.

Various attempts to improve the visibility of signage have been reported. Burns et al., U.S. Pat. Nos. 5,920,429, 5,754,337, and 5,674,622 disclose fluorescent yellow articles comprising two fluorescent dyes dispersed in a polymeric matrix suitable for applying to retroreflective surfaces. The resulting yellow retroreflective articles are suitable for traffic signs.

Nagaoka et al., U.S. Pat. No. 6,048,069 disclose retroreflective sheeting having image elements made from light transmitting prismatic sheeting. An adhesive layer adheres the prismatic sheeting to the retroreflective sheeting and the adhesive may contain a fluorescent red dye.

Sakaya et al., European Patent Application No. 792,907 disclose polyolefin resin films suitable for outdoor use. The films contain fluorescent substances including perylene dyes and a shielding agent to suppress the deactivation of the fluorescent substance under outdoor conditions and from other substances in the film.

Nagaoka, International Application No. PCT/US97/17457 discloses a retroreflective graphic article having an image layer disposed on a retroreflective base sheet and a dye receiving layer disposed on the image layer. The image layer contains a pigment and a fluorescent dye. The fluorescent dye migrates to the receiving layer, thereby reducing adverse effects from the pigment on the visual properties of the dye.

Smith, International Application No. PCT/AU96/00303 discloses a method for making fluorescent dye compositions useful for making luminescent sunlight collectors from a solution of a fluorescent dye and a polymerizable monomer wherein the solution is prepared without additional solvent and with the aid of ultrasonic mixing. The monomer solution is polymerized in a vertical tube to form a luminescent sunlight collector.

SUMMARY OF THE INVENTION

The present invention provides compositions, which can form a coating on a substrate, having a red color fidelity substantially free of orange or pink hues. Further, the coatings of the invention have a visual brightness substantially attributable to fluorescent or emitted light with respect to the total light observed from a coated surface. Accordingly, the present invention in one aspect is a fluorescent red composition comprising a red perylene dicarboximide dye having the formula wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each individually chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl; a film forming resin; and a solvent, wherein the composition provides a coating having chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

Another aspect of the present invention is a fluorescent red coating comprising a fluorescent red composition applied to a substrate wherein the coating has chromaticity coordinates (x,y) within the area defined by (0.648, 0351), (0.735, 0.265), (0.629, 0.281) and (0.565,0.346) in terms of the CIE 1931 Standard Colorimetric System and measured using 0/45 geometry and evaluated with CIE Standard Illuminant D65 and a fluorescence luminance factor of at least about 8.

Yet another aspect of the present invention is a fluorescent red retroreflective article which includes a retroreflective substrate having a retroreflective side and a fluorescent red composition disposed on the retroreflective substrate wherein the retroreflective article has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

A further aspect of the invention is a method for making a fluorescent red article comprising the steps of preparing a fluorescent red composition, applying the composition to a film to form a coating thereon wherein the film is supported by a backing film, removing the backing film and applying the coated film to a substrate having a pressure sensitive adhesive layer to form a laminate.

Another aspect of the invention is method for making a fluorescent red article comprising the steps of preparing a fluorescent red composition, applying the composition to a first side of a film to form a coating thereon; and affixing the coated first side of the film to a substrate to form a laminate.

DETAILED DISCUSSION OF THE INVENTION

In describing aspects of the invention certain terms will have the meaning defined herein.

"CIE" refers to the International Commission on Lighting which is the responsible body for international recommendations for photometry and colorimetry.

Figure 1:
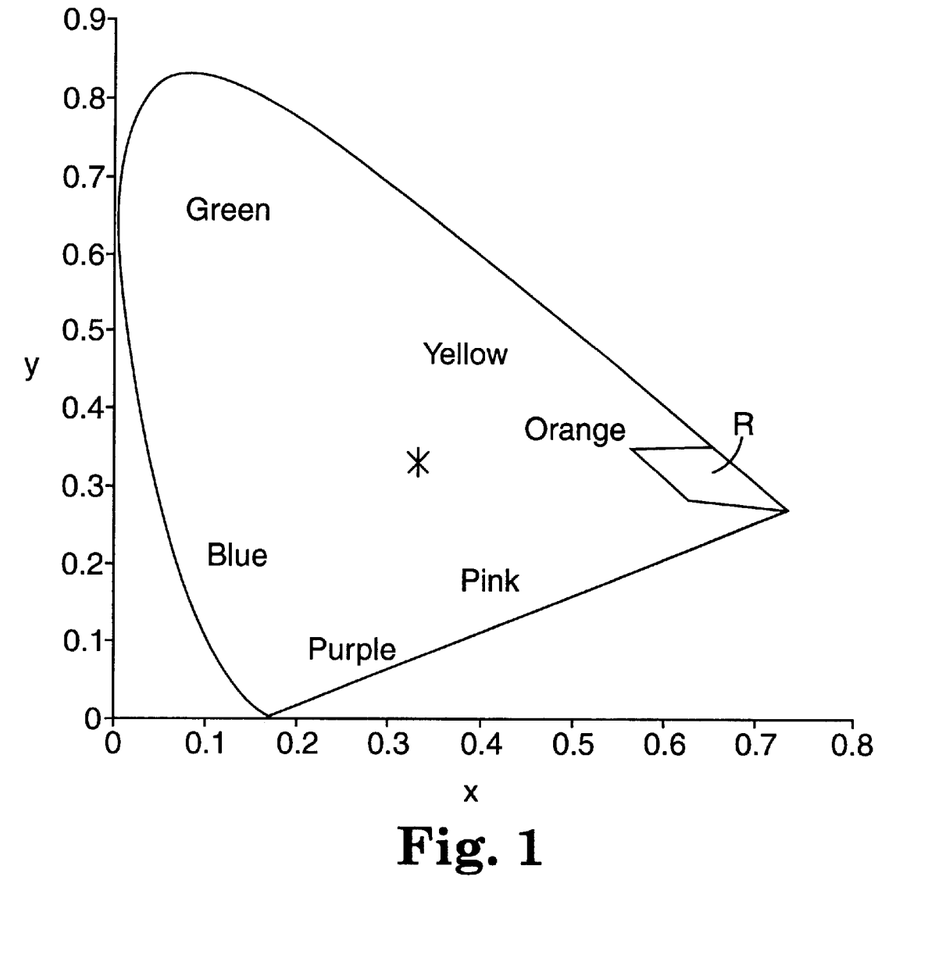
FIG. 1 is a 1931 CIE x,y chromaticity diagram showing areas within the diagram generally representing various color spaces.

"Chromaticity diagram" or "x,y diagram" refers to a two-dimensional diagram in which points specified by chromaticity coordinates (x, y) represent the chromaticities of color stimuli in the CIE color matching system. FIG. 1 shows the 1931 CIE x,y chromaticity diagram with color regions identified.

"Luminous" refers to the property of reflecting or emitting light from a surface.

"Luminance" refers to the luminous intensity or brightness of light radiating from a surface. Luminance is usually expressed as the CIE tristimulus value Y. Tristimulus values are the amounts of three primary colors that specify a color stimulus. Tristimulus values can be calculated if the reflectance spectrum of a sample is known and describe the whole sensation of color. The luminance value may be described and measured as total luminance ($Y_t$), reflected luminance ($Y_r$) and fluorescence luminance ($Y_f$). Total luminance is the sum of reflected and fluorescence luminance.

"Fluorescence" refers to luminescence that is caused by the absorption of radiation at one wavelength followed by nearly immediate re-radiation at a different wavelength and that ceases almost at once when the incident radiation stops.

"Visibility" refers to threshold of visual detection of an object with certainty by an observer actively searching for the object.

"Conspicuity" refers to the ease with which an object is visually discovered and is a function of the magnitude of the contrast between an object and the background. Objects become more conspicuous as their contrast with the surroundings increases. With respect to fluorescent objects, fluorescence luminance that is relatively a greater portion of total luminance under conditions of poor visibility provides greater visibility and conspicuity relative to a non-fluorescent object.

"Retroreflective" refers to the property of a surface to return a majority of incident light back in the direction of the source over a wide range of surface orientation with respect to the source. Colorimetric measurements for a retroreflective surface are defined in terms of measurement geometry. A preferred measurement geometry for retroreflective surfaces is 0/45 geometry as define by the 1931 CIE Standard Colorimetric System and evaluated with CIE Standard Illuminant D65.

Figure 2:
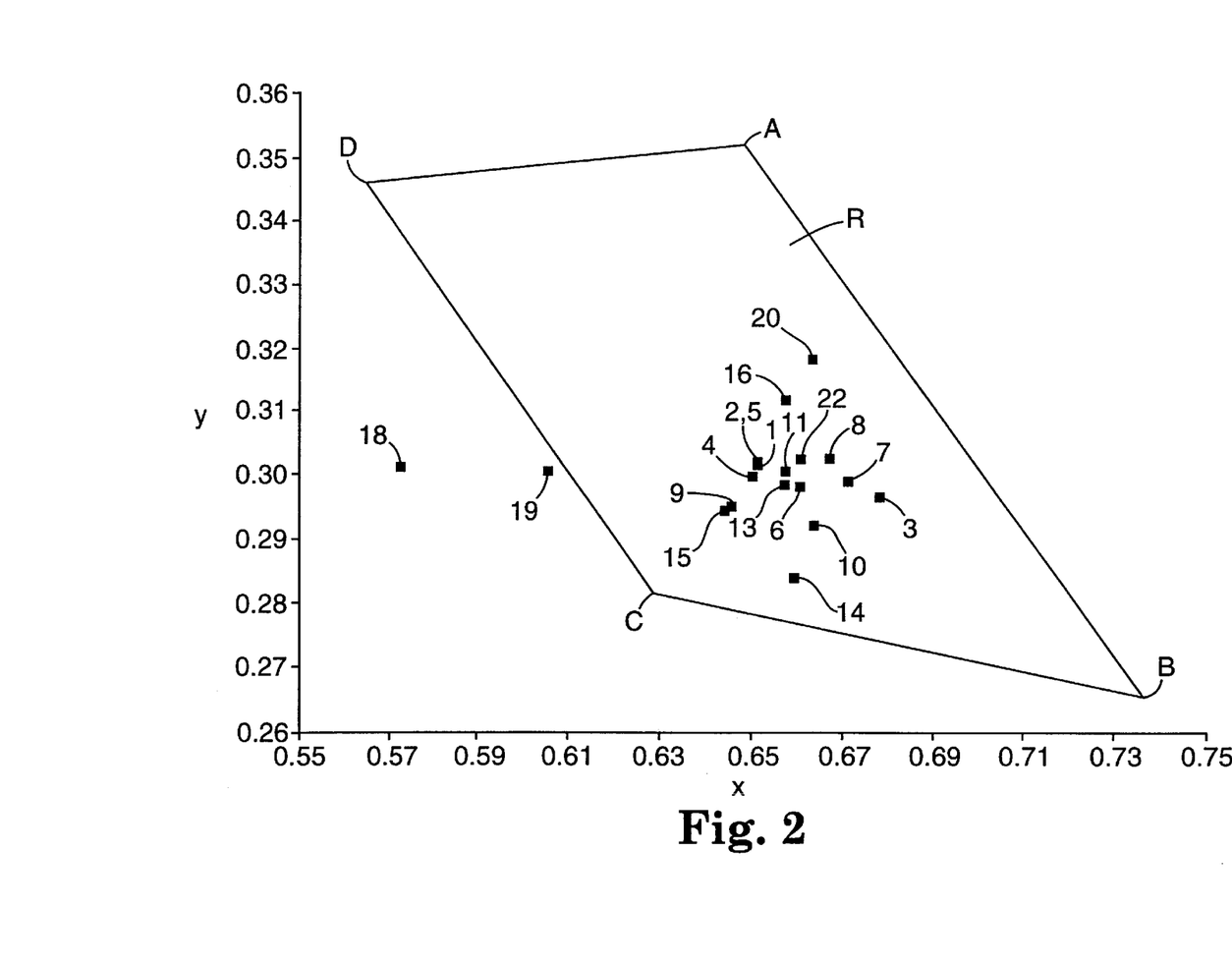
FIG. 2 is a 1931 CIE x,y chromaticity diagram defining the area of color space defined herein as red.

"Red" refers to the color which is within the area defined by the four CIE chromaticity (x,y) coordinates (0.648, 0351), (0.735, 0.265), (0.629, 0.281) and (0.565,0.346) plotted and shown in FIG. 2.

In one aspect, the invention relates to fluorescent compositions capable of forming a coating having a red color defined by chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and CIE Standard Illuminant D65. The composition is obtained by combining a fluorescent red perylene dicarboximide dye, a film forming resin, and a solvent in which both the dye and resin are soluble. The composition may be applied as a coating to a substrate by any suitable method such as a wire wound draw down bar, screen print, spray, gravure, doctor blade, roll coater and the like. The coating may be applied to uniformly cover the substrate or as indicia on the substrate to communicate information. In one embodiment, the substrate may be a retroreflective sheeting, for example, having a white or silvery white color. Although other colored substrates are permitted by the invention, a white substrate tends to maximize the luminance of the coated object. The coating may additionally contain a light transmissive pigment as long as the pigment does not cause the color and luminance properties of the coating to shift outside the specified range. Representative pigments are found in U.S. Pat. No. 5,272,562, incorporated herein by reference, and include rutile titanium dioxide and C.I. Red 179.

The fluorescent red perylene dye of the invention is preferably co-soluble with a film forming resin and provides a coating having chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8 and a total luminance of at least about 11. The ratio of fluorescence luminance to total luminance is at least about 0.7. Typically, measurements for luminance and chromaticity are made against a white background and are more fully described in the Examples.

FIG. 1 shows a 1931 CIE x, y chromaticity diagram identifying various color regions. The area within the red color space R of the invention is defined by x, y chromaticity coordinates (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65. The asterisk indicates the D65 origin.

FIG. 2 shows a 1931 CIE x, y chromaticity diagram defining the color space (0.648, 0.351), (0.735, 0.265), (0.629, 0.281) and (0.565, 0.346). Coordinate (0.648, 0.351) is designated as A. Coordinate (0.735, 0.265) is designated as B. Coordinate (0.629, 0.281) is designated as C. Coordinate (0.565, 0.346) is designated as D. The coordinates A, B, C and D define the red color space R of the invention. Data points summarized in the Examples are displayed and designated by Example number. The data point for Example 17 is off-scale and not shown. The significance of the data points is discussed with the description of the Examples.

Suitable red dyes include perylene dicarboximide compounds having the formula wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each individually chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl.

A preferred dye is perylene-1,6,7,12-tetraphenoxy-3,4,9,10-tetracarboxylic acid-bis(2,6-diisopropylanilide) and is commercially available under the trade designation "Lumogen F Red 300" from BASF Corp., Mount Olive N.J. In suitable proportions, the dye level will provide a fluorescent red color within the chromaticity coordinates for red as defined above. The invention preferably contains 0.5 to 4 parts by weight dye, more preferably 0.5 to 3 parts by weight dye, and most preferably 0.5 to 2 parts by weight dye. The dye content based on the resin content of the invention is preferably 1 to 8 wt. %, more preferably 1 to 6 wt. %, and most preferably 2 to 5 wt. %. The amount of dye for a particular use is readily determined by its ability to form a solution with the film forming resin and by chromaticity and luminance of the coatings made therefrom. One skilled in the art will recognize that the actual amount of dye chosen will depend upon variables relating to the intended final use of the invention. If the dye content is too low, chromaticity and/or luminance may fall outside of the parameters of the invention. If the dye content is too great, the dye may tend to become self quenching of fluorescence and fail to meet the luminance requirement.

The film forming resin forms a film after applying the coating composition to the surface of a substrate and evaporating the solvent. The film forming resin component of the present invention provides a matrix to bind the fluorescent red dye to the substrate. Suitable film forming resins include thermoplastic and thermoset resins which form a solution with suitable red dyes and which do not adversely affect the chromaticity and luminance of coatings made therefrom. Suitable resins include, for example, a polyester, a vinyl, a polyacrylate or a polymethylmethacrylate polymer or copolymer or mixtures thereof.

Polyester resins include a copolyester resin commercially available under the trade designation "Vitel 2300BG" from Bostik Inc., Middleton, Mass. Vinyl resins include vinyl a chloride/vinyl acetate/vinyl alcohol terpolymer resins such as the resin commercially available under the trade designation "UCAR VAGH" from Union Carbide Corp., Danbury Conn. A suitable film forming acrylate resin is methylmethacrylate/butylmethacrylate copolymer commercially available under the trade designation "Paraloid B66" from Rohm and Haas, Corp., Philadelphia, Pa. The composition of the invention preferably contains 20 to 80 parts by weight of resin, more preferably 30 to 70 parts by weight resin and most preferably 35 to 65 parts by weight resin.

A composition of the present invention also comprises a solvent. The solvent may be a single substance or a blend of solvents. Suitable solvents are those which dissolve the dye and the film forming resin and which provide a coating with the defined chromaticity and luminance parameters. Suitable solvents include dipropylene glycol methyletheracetate available under the trade designation "Dowanol DPMA" from Dow Chemical, Co., Midland Mich., methylisobutyl ketone (MIBK), methylethylketone (MEK), diisobutyl ketone (DIBK), toluene, and mixtures thereof.

A composition of the present invention may contain optional additives to provide desirable properties such as, for example, flow characteristics and light stability. Suitable flow agents include a silicone material such as a flow agent commercially available under the trade designation "SF 96 Silicone" from General Electric Co., Schenectady N.Y. or a nonionic fluorosurfactant commercially available under the trade designation "FC 431" (a 20 wt. % solution of fluorosurfactant in DPMA solvent) from Minnesota Mining and Manufacturing Company ("3M"), St. Paul Minn. Typically, the amount of additives does not exceed 5 parts by weight of the total composition after evaporation of the solvent.

A composition may also contain ultraviolet (UV) light absorbing compounds to improve the light stability of coatings and films made therefrom, especially from exposure to sunlight. UV light absorbing compounds may be present at 0.4 wt. % to 4 wt. % based on the weight of the film forming resin. Commercially available suitable light stabilizing compounds include benzophenones, such as those available under the trade designation "Cyasorb UV531" from Cytec Industries; triazines, such as those available under the trade designation "Cyasorb UV 1164" from Cytec Industries; and benzotriazoles, such as those available under the trade designations "Tinuvin 327" and "Tinuvin 328" from Ciba Specialty Chemicals, Tarrytown N.Y.

A composition of the present invention may be prepared by combining the components described above. For example, the solid red dye may be stirred into a solution of "Paraloid B66" resin in "Dowanol DPMA" to form a solution of the resin and dye. If other additives such as flow agents or UV light absorbing agents are used, they may be conveniently added to the composition.

The invention is also embodied in reflective articles made by coating a reflective or retroreflective substrate with a fluorescent red composition defined above. Generally, retroreflective materials include a monolayer of optical elements typically in the form of glass microspheres (i.e., beads). These microspheres can be embedded in a polymeric binder layer or pressed into a polymeric film, for example. Alternatively, the retroreflective materials can include prismatic-type optical elements. Such materials are well known to those of skill in the art. Retroreflective materials (also referred to as sheeting) of the present invention may be, for example, "beaded sheeting" in the form of an enclosed-lens sheeting, embedded-lens sheeting, or encapsulated-lens sheeting, as well as cube corner retroreflective sheeting. Such articles are described, for example, in U.S. Pat. Nos. 2,407,680; 4,511,210; 4,950,525; 3,190,178; 4,025,159; 4,896,943; 5,064,272; 5,066,098; 3,684,348; 4,801,193; 4,895,428; and 4,938,563.

Exemplary retroreflective materials are commercially available under the trade designations "Scotchlite 3870 High Intensity Grade Sheeting" (an encapsulated lens type), "Scotchlite Diamond Grade LDP 3970 Retroreflective Sheeting" and "Scotchlite Diamond Grade VIP 3990 Retroreflective Sheeting" (cube-corner types) from Minnesota Mining and Manufacturing, St, Paul Minn. The fluorescent red composition may be applied directly to the reflective or retroreflective substrate, or it may be applied, for example, to a clear carrier sheet or film, for example, a thermoplastic carrier sheet, which is then laminated to the substrate.

A carrier sheet or film may comprise a thermoplastic or thermoset resin. Suitable resins include polyurethanes, polyvinylchlorides, polyesters, unsaturated polyesters, and acrylic polymers or copolymers. Suitable films typically have a thickness of about 50 microns to about 75 microns and may be supported, for example, by a backing film. The backing film may be any suitable material such as a polyethylene coated paper or a polyester film. The fluorescent red composition may be applied substantially uniformly across the entire surface of the carrier sheet or in the form of indicia. Solvent may be evaporated from the coating by any suitable conventional means. The carrier sheet having a fluorescent red coating may then be laminated, for example, to an adhesive coated reflective or retroreflective sheet or to an adhesive coated release liner having a reflective or retroreflective surface by any suitable lamination techniques. Exemplary release liners include paper, polyester or polyolefin coated with a silicone release agent on the side of the liner in contact with the adhesive. The release liner protects the adhesive layer and facilitates handling of the carrier sheet prior to use. The release liner can be stripped from the coated carrier sheet leaving the adhesive on the carrier sheet. The carrier sheet can then be adhered to a rigid material such as aluminum sheeting suitable for signage.

A carrier sheet also may provide an overlay film to protect the coated reflective substrate from the weather when used in an outdoor environment. The overlay may optionally include a UV light absorbing substance, such as those described above, to reduce degradation from exposure to sunlight. The UV light absorbing substance may be incorporated into the overlay rather than into the fluorescent coating as the UV light absorbing substance: may adversely affect fluorescence if dispersed in the same matrix as the fluorescent dye. Typically, the overlay is disposed on backing film and the fluorescent red coating is then applied to the acrylic film and reflective articles made as described above. However, the overlay may be applied to the fluorescent red coating after the reflective article is formed without departing from the spirit of the invention.

Lamination may be performed as understood by one skilled in the art, for example, by applying heat and pressure, or by pressure alone, to achieve a uniformly laminated article. Pressure can be applied, for example, by nip rollers or by a hand roller. Alternatively, lamination may be performed using an adhesive.

In one embodiment, the carrier sheet having a fluorescent red coating may be applied, for example, to a film, for example, polycarbonate, having retroreflective elements such as cube corner reflective elements on one surface. If the carrier sheet has a backing film, the film may be removed and the coated surface of the carrier sheet may be laminated, for example, by hot lamination, to the surface of the polycarbonate film opposite the surface having the cube corner structure. Alternatively, the backing sheet may be removed after the laminate has been formed. The laminate may be affixed to a rigid substrate with, for example, an adhesive to provide a fluorescent red article such as a stop sign. A reflective or retroreflective layer may be applied to the fluorescent red coating side of the carrier sheet before laminating the carrier sheet to the substrate, or the reflective or retroreflective layer may be applied to the rigid substrate and the fluorescent red side of the carried sheet laminated to the reflective or retroreflective layer of the substrate.

In yet another embodiment, the fluorescent red composition may be applied on a layer of a retroreflective sheeting. As described above, the retroreflective sheeting comprises optical elements and various layers, for example, as described in any of U.S. Pat. Nos. 2,407,680; 4,511,210; 4,950,525; 3,190,178; 4,025,159; 4,896,943; 5,064,272; 5,066,098; 3,684,348; 4,801,193; 4,895,428; and 4,938,563. The composition may be applied, for example, on a layer such as an overlay or top film prior to laminating the layer containing the elements or may be applied on the binder layer opposite the elements prior to laminating the top film.

Figure 3A:
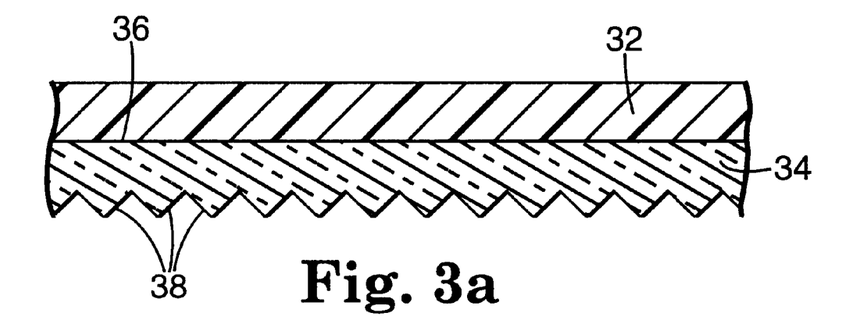
FIG. 3a is a cross sectional illustration of a portion of one embodiment of the invention.
Figure 3B:
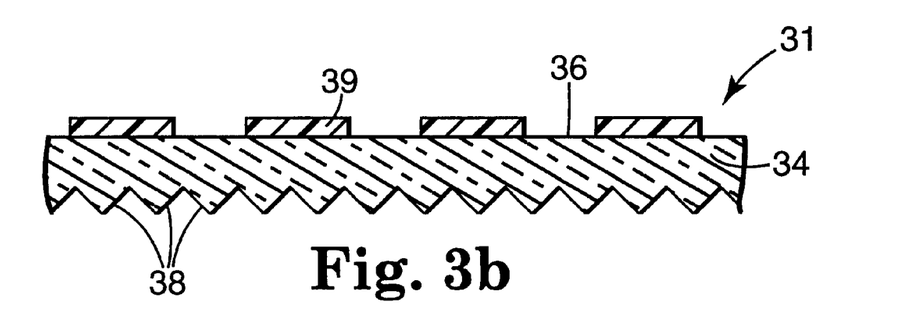
FIG. 3b is a cross sectional illustration of a portion of another embodiment of the invention.

Other embodiments of the present invention will be discussed with reference to the figures. FIG. 3a shows fluorescent article 30 with the fluorescent red composition of the invention forming color layer 32 disposed on substrate 34 having retroreflective elements 38. Color layer 32 is formed on surface 36 of substrate 34 opposite retroreflective elements 38. FIG. 3b shows fluorescent article with the fluorescent red composition of the invention applied to substrate 34 on surface 36 as indicia 39. The composition may be applied by coating or printing methods well known in the art.

Figure 4:
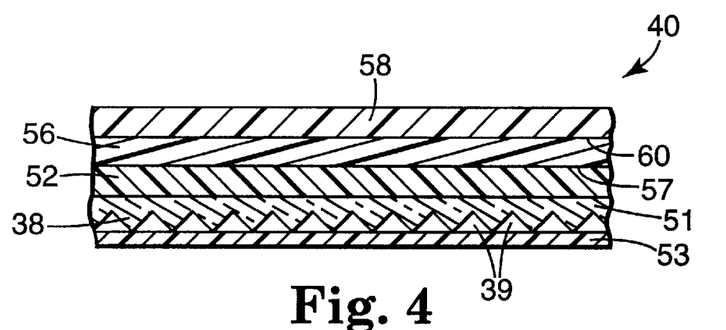
FIG. 4 is a cross sectional illustration of a portion of another embodiment of the invention.

FIG. 4 shows another embodiment of the invention wherein the fluorescent red composition is disposed as color layer 52 on carrier sheet 56 supported by strippable backing film 58 comprising paper having coated surface 60 (for example, polyethylene). Color layer 52 may be uniformly applied to surface 57 of the carrier sheet 56 or may be applied in the form of indicia (not shown). Surface 57 of the carrier sheet 56 having color layer 52 is affixed to retroreflective substrate 51 having cube corner retroreflective elements 38 to form a laminate structure 40. Carrier sheet 56 may be affixed to the retroreflective substrate by lamination as described above. For example, if retroreflective substrate 51 is a polycarbonate, carrier sheet 56 may be laminated to retroreflective substrate 51 by applying pressure at about 200° C. If retroreflective substrate 51 is an ethyleneviny-lacetate resin, for example, carrier sheet 56 may be applied by a hand roller to provide a uniform laminate. Film 53 is positioned on cube corner retroreflective elements 38 to hermetically seal cube corner cube corner retroreflective elements 38. Film 53 helps to maintain an air interface on cube corner retroreflective elements 38 which is important for total internal reflection for efficient retroreflection. Film 53 may be heat sealed, adhesively bonded or ultrasonically welded to cube corner retroreflective elements 38 uniformly or in an intermittent pattern to provide hermetically sealed cells 39. Film 53 also may provide a uniform white backing which, when appropriately pigmented, enhances the color and fluorescence of the construction.

Figure 5A:
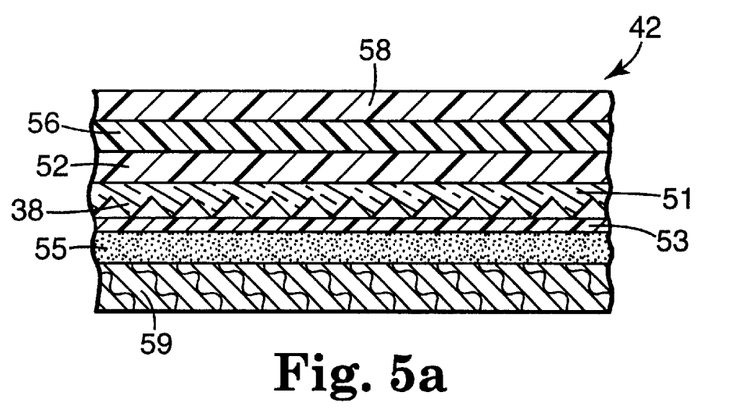
FIGS. 5a and 5b are cross sectional illustrations of a portion of another embodiment of the invention having a release liner.

FIG. 5a shows laminate 42 comprising laminate 40 where film 53 is applied to releasable liner 59. Releasable liner 59 has adhesive layer 55 to which film 53 adheres. The adhesive bonds releasable liner 59 to laminate structure 40 until liner 59 is removed. Adhesive layer 55 remains affixed to film 53 after removing liner 59. Adhesive layer 55 is then available to affix laminate structure 40 to another substrate (not shown) such as signage. (Coated surface 60 and surface 57 are not depicted.)

Figure 5B:
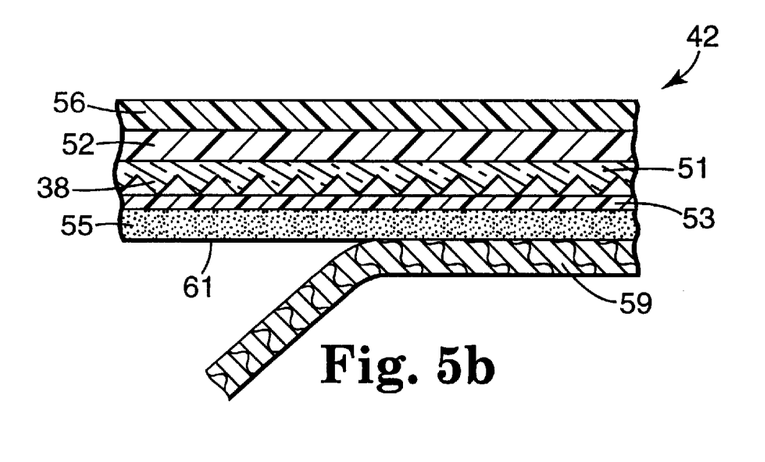

FIG. 5b shows laminate structure 42 after backing film 58 has been removed and releasable liner 59 is partly stripped away from adhesive layer 55 thereby exposing surface 61 of adhesive layer 55.

Chromaticity coordinates and total and fluorescence luminance were determined from measurements using a instrument under the trade designation "Labsphere BFC-450 Bispectral Fluorescence Colorimeter" having two monochromators and available from Labsphere, Inc., North Sutton, N.H. The two monochromator method is the most accurate method for the color measurement of fluorescent materials. The method requires a two monochromator spectrophotometer employing monochromatic illumination and monochromatic viewing. Two monochromator instruments, also known as bispectral colorimeters, allow the separate measurement of the reflective radiance and fluorescence radiance at each combination of illumination and viewing wavelength. This allows separation of fluorescence luminance ($Y_f$) from total luminance ($Y_t$).

EXAMPLES

Examples 1–10

Samples of fluorescent red compositions suitable for forming coatings on a substrate were made by stirring solid fluorescent dye commercially available as "Lumogen F Red 300" from BASF Corp. in a prepared solution of clear film forming resin. The clear solution contained "Dowanol DPMA", acrylic resin "Paraloid B66" from Rohm and Haas, Inc. and flow control agents such as "SF96 Silicone" solution and "FC431" wetting agent. The composition of Examples 1 to 10 were as follows:

The fluorescent dye solution was coated on sheeting available under the trade designations "Scotchlite Diamond Grade 3970 Retroreflective Sheeting" to form Examples 1–8, "Scotchlite 3870 High Intensity Grade Sheeting" to form Example 9, and "Scotchlite 710 Retroreflective Sheeting" form Example 10, all of which are commercially available from 3M. The solution was applied using a #16 wire wound bar, except in Example 3 the solution was applied with a polyester 157 mesh screen. The coating was air dried for 10 minutes and then oven dried at 120° C. for 45 minutes to provide a dry coating thickness of about 10 microns. Color measurements were made on the resulting sheet with a Labsphere BFC-450 Bispectral Fluorescence Colorimeter and are summarized in Table 1.

TABLE 1

| Example No.[a] | Fluorescent Red Dye Wt. %[b] | CIE x, y Coordinates | $Y_f$ | $Y_t$ | $Y_f/Y_t$ |
| --- | --- | --- | --- | --- | --- |
| 1 | 5 | 0.664, 0.303 | 15.78 | 19.81 | 0.796 |
| 2 | 3 | 0.651, 0.302 | 18.74 | 24.00 | 0.781 |
| 3 | 5 | 0.678, 0.296 | 14.99 | 18.79 | 0.798 |
| 4 | 2 | 0.650, 0.300 | 17.7 | 22.85 | 0.775 |
| 5 | 2.5 | 0.651, 0.302 | 17.73 | 22.31 | 0.795 |
| 6 | 3 | 0.661, 0.298 | 16.45 | 21.21 | 0.776 |
| 7 | 4 | 0.671, 0.299 | 15.68 | 19.51 | 0.804 |
| 8 | 5 | 0.667, 0.302 | 15.64 | 19.54 | 0.800 |
| 9 | 5 | 0.646, 0.295 | 10.82 | 14.29 | 0.757 |
| 10 | 5 | 0.666, 0.292 | 11.86 | 16.06 | 0.739 |

[a]Samples prepared on "Scotchlite Diamond Grade LDP 3970 Retroreflective Sheeting" from 3M unless indicated otherwise.
[b]wt. % of "Lumogen Red F 300" based on resin solids in the dried coating.

Examples 1–10 show that the fluorescent dye compositions at various dye concentration on different retroreflective substrates maintain color integrity within the chromaticity color box defined by x,y coordinates (0.648, 0.351), (0.735, 0.265), (0.629, 0.281) and (0.565, 0.346) and have a fluorescence luminance factor of at least about 8 and have a ratio of the fluorescence luminance factor to the total luminance factor of at least about 0.7.

Example 11

The fluorescent red composition of Example 1 was made except that the "Dowanol DPMA" solvent was replaced by a 1:1:1 mixture of methylisobutyl ketone, di-isobutyl ketone and toluene. "Lumogen F Red 300" dye was present in an amount to provide 5 wt. % dye based on resin solids in a dry coating. An acrylic film having a thickness of 50 microns was cast from medium grade impact modified resin from Elf-Atochem, Philadelphia, Pa. onto polyethylene coated paper to form a first laminate. The dye solution was applied to the 50 micron acrylic film with a #16 wire wound bar to form a coating as described in Examples 1–10. The coated acrylic film was then applied to an acrylic pressure sensitive adhesive on a plastic liner and the polyethylene coated paper removed to form a second laminate. The plastic liner provided support and protection to the coating during handling. The test specimen was prepared by removing the liner

| | Examples (component units are in parts by weight) | | | | | | | | | |
| --- | --- | --- | --- | --- | --- | --- | --- | --- | --- | --- |
| Component | 1 | 2 | 3 | 4 | 5 | 6 | 7 | 8 | 9 | 10 |
| "Paraloid B66" resin | 40.8 | 40.8 | 40.8 | 40.8 | 40.8 | 40.8 | 40.8 | 40.8 | 40.8 | 40.8 |
| "Lumogen F Red 300" dye | 2.0 | 1.2 | 2.0 | 0.8 | 1.0 | 1.2 | 1.6 | 2.0 | 2.0 | 2.0 |
| "Dowanol DPMA" | 66.0 | 66.0 | 66.0 | 66.0 | 66.0 | 66.0 | 66.0 | 66.0 | 66.0 | 66.0 |
| "SF96 Silicone" (1 wt. % silicone in xylene) | 1.4 | 1.4 | 1.4 | 1.4 | 1.4 | 1.4 | 1.4 | 1.4 | 1.4 | 1.4 |
| "FC431" wetting agent (20 wt % in "Dowanol DPMA") | 2.8 | 2.8 | 2.8 | 2.8 | 2.8 | 2.8 | 2.8 | 2.8 | 2.8 | 2.8 | leaving the adhesive on the surface of the dye coating. The adhesive coated fluorescent red first laminate was then adhered to "Scotchlite Diamond Grade LDP 3970 Retroreflective Sheeting" to provide a laminate construction having chromaticity x,y color coordinates of 0.654, 0.300, a fluorescence luminance of 14.82, a total luminance of 18.97 and a ratio of fluorescence luminance to total luminance of 0.781.

Example 12

A composition was prepared as in Example 11 and applied as a patterned coating to the 50 micron cast impact modified acrylic film supported by polyethylene coated paper. The same steps as in Example 11 were followed to form an adhesive coated fluorescent laminate. The laminate was adhered to "Scotchlite Diamond Grade VIP 3990 Retroreflective Sheeting". The resulting imaged areas had chromaticity x,y color coordinates of 0.656, 0.3016, a fluorescence luminance of 14.86, a total luminance of 19.43 and a ratio of fluorescence luminance to total luminance of 0.765.

Example 13

A fluorescent red patterned coating was created on 50 micron cast impact modified acrylic film as described in Example 12. The polyethylene coated paper was removed and the patterned side of the acrylic film was laminated with sufficient pressure at a temperature of approximately 200° C. to a polycarbonate film having a retroreflective cube corner structure on one surface to provide a uniform laminate. The polycarbonate film was a bisphenol polycarbonate commercially available under the trade designation "MAKROLON 2407" from Bayer Co., Pittsburgh, Pa. The hot lamination occurred at the side of the polycarbonate film opposite the cube corner structure and did not require an adhesive. The resulting construction had a colored layer between a clear acrylic film and a polycarbonate film. The color of the construction was measured with a white polyester backing, the white polyester film having chromaticity x, y coordinates of 0.310, 0.327 and a total luminance factor $Y_t$ of 74.97 and a fluorescence luminance factor $Y_f$ of 0.0. The construction had chromaticity x, y color coordinates of 0.659, 0.298, a fluorescence luminance of 14.64, a total luminance of 19.50 and a ratio of fluorescence luminance to total luminance of 0.751.

Example 14

A fluorescent red composition was prepared as in Example 1 except the clear film forming resin was a solution of "UCAR VAGH" (Vinyl chloride/Vinyl acetate/Vinyl alcohol-terpolymer resin) from Union Carbide and the following solvent were used. The formulation with dye was:

| "UCAR VAGH" | 14.5 parts by weight |
| methyl isobutyl ketone | 11 parts by weight |
| methyl ethyl ketone | 11 parts by weight |
| toluene | 13 parts by weight |
| "Lumogen Red F300" | 0.54 parts by weight |

This solution was coated onto "Scotchlite Diamond Grade LDP 3970 Retroreflective Sheeting" using a #20 wire wound bar. The coating was air dried for 60 minutes and the color read on the Labsphere BFC-450 Bispectral Fluorescence Colorimeter. The resulting construction had chromaticity x, y color coordinates of 0.654, 0.284, a fluorescence luminance of 10.25, a total luminance of 14.38 and a ratio of fluorescence luminance to total luminance of 0.713.

Example 15

A fluorescent red composition was prepared as in Example 14 except the clear film forming resin was a solution of "VITEL 2300BG" (high molecular weight linear saturated copolyester resin) commercially available from Bostik Inc., Middleton, Mass. and the solvent are as described below. The formulation with dye was:

| "VITEL 2300BG" | 14.2 parts by weight |
| methyl isobutyl ketone | 28 parts by weight |
| methyl ethyl ketone | 28 parts by weight |
| "Lumogen Red F300" | 0.60 parts by weight |

This solution was coated onto "Scotchlite Diamond Grade LDP 3970 Retroreflective Sheeting" using a #20 wire wound bar. The coating was air dried for 60 minutes and color read on the Labsphere BFC-450 Bispectral Fluorescence Colorimeter. The resulting construction had chromaticity x,y color coordinates of 0.644, 0.295, a fluorescence luminance of 13.75, a total luminance of 18.44 and a ratio of fluorescence luminance to total luminance of 0.746.

Comparative Examples 16–20

Comparative Example 16 illustrates the result of applying ink commercially available from 3M under the trade designation "Scotchlite 882I" in place of the fluorescent red composition of Example 1 to "Diamond Grade LDP 3970 Retroreflective Sheeting". The red pigments in the "Scotchlite 882I" ink are non-fluorescing. The luminance from this Example is entirely provided by reflected light.

Comparative Examples 17, 18 and 19 were prepared according to Example 1 at the dye levels indicated in Table 2. These results illustrate that low concentrations of "Lumogen F Red 300" fail to provide the chromaticity properties of the invention.

Comparative Example 20 was prepared as described in Example 1 except that the composition additionally contains a light transmissive pigment in the "CVR-743M" and a lesser amount of fluorescent dye as indicated in Table 2. The specific composition of comparative Example 20 is:

| "Paraloid B66" | 34.6 parts by weight |
| "Lumogen F Red 300" | 0.5 parts by weight |
| "CVR-743M"* | 6.8 parts by weight |
| "Dowanol DPMA" | 63.6 parts by weight |
| cyclohexanone (solvent) | 18.8 parts by weight |

*A red organic pigment dispersion commercially available under the trade designation "CVR-743M" from Penn Color Inc., Doylestown PA.

The solution was applied by screen printing using a 150 mesh screen to "Scotchlite VIP 3990 Retroreflective Sheeting". This Example demonstrates the adverse effect on fluorescence luminance from the presence of additional colorant in the form of a pigment.

Chromaticity data for Comparative Examples 16–20 is summarized in Table 2 and demonstrates compositions failing to provide the chromaticity properties of the invention.

TABLE 2

| Example No. | Fluorescent Red Dye (parts by wt.) | Fluorescent Red Dye Wt. %[a] | CIE x, y Coordinates | $Y_f$ | $Y_t$ | $Y_f/Y_t$ |
|---|---|---|---|---|---|---|
| 16 | 0[b] | 0[b] | 0.654, 0.311 | 0.0 | 3.46 | 0.0 |
| 17 | 0.2 | 0.5 | 0.532, 0.299 | 16.4 | 28.94 | 0.567 |
| 18 | 0.4 | 1 | 0.573, 0.301 | 18.95 | 28.15 | 0.673 |
| 19 | 0.6 | 1.5 | 0.606, 0.300 | 18.66 | 25.87 | 0.721 |
| 20 | 0.5 | 1.25 | 0.667, 0.317 | 3.99 | 9.06 | 0.440 |

[a]wt % of "Lumogen Red F 300" based on resin solids in the dried coating.
[b]non-fluorescent pigment.

The complete disclosure of all patents, patent documents, and publications are incorporated herein by reference as if individually incorporated. Various modifications and alterations of this invention will become apparent to those skilled in the art without departing from the scope and spirit of this invention.

What is claimed is:

1. A fluorescent red composition comprising:
   a. a perylene dicarboximide dye having the formula wherein
   $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each individually chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl;
   b. a film forming resin; and
   c. a solvent;
   wherein the composition provides a coating having chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

2. The composition of claim 1 wherein the coating has a total luminance factor of at least about 10.

3. The composition of claim 2 wherein the coating has a ratio of the fluorescence luminance factor to the total luminance factor of at least about 0.7.

4. The composition of claim 3 wherein the ratio of the fluorescence luminance factor to the total luminance factor is at least about 0.75.

5. The composition of claim 1 wherein the film forming resin comprises at least one of an acrylic resin, a polyester resin and a vinyl resin.

6. The composition of claim 5 wherein the acrylic resin comprises a polymethylmethacrylate or a copolymer of methylmethacrylate and butylmethacrylate.

7. The composition of claim 1 wherein the solvent comprises dipropyleneglycol monomethylether acetate, toluene, methylisobutylketone, diisobutylketone, methylethylketone or mixtures thereof.

8. The composition of claim 1 wherein the red perylene dicarboximide dye is not less than about 0.6 wt. % of the film forming resin after drying.

9. The composition of claim 7 wherein the solvent is dipropyleneglycol monomethyl ether acetate.

10. The composition of claim 1 wherein X, Y and Z are $OR_3$ and $R_3$ is phenyl.

11. A fluorescent red coating comprising the composition of claim 1 applied to a substrate wherein the coating has chromaticity coordinates (x,y) within the area defined by (0.648, 0351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

12. A fluorescent red retroreflective article comprising:
    a. a retroreflective substrate; and
    b. a fluorescent red composition according to claim 1 disposed as a coating on the retroreflective substrate wherein the retroreflective article has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

13. The fluorescent red article of claim 12 wherein the coating is substantially free of solvent.

14. The fluorescent red retroreflective article of claim 12 wherein the thickness of the fluorescent red coating is about 5 microns to about 50 microns.

15. The fluorescent red retroreflective article of claim 12 wherein the coating comprises indicia.

16. A method for making a fluorescent red article comprising the steps:
    a. preparing a fluorescent red composition according to claim 1;
    b. applying the composition to a film to form a coating thereon; and
    c. applying the coated film to a substrate to form a laminate.

17. The method of claim 16 wherein the film comprises a thermoplastic film.

18. The method of claim 16 wherein the film is supported by a backing film and the backing film is removed before forming the laminate.

19. The method of claim 16 wherein the composition is applied to the film as indicia.

20. The method of claim 16 wherein the substrate has an adhesive layer and the coated film is applied to the adhesive to form a laminate.

21. The method of claim 16 wherein the substrate is a retroreflective substrate.

22. The method of claim 16 wherein the substrate is a polycarbonate film or a polymethylmethacrylate film and the coated film is laminated to the polycarbonate film or polymethylmethacrylate film.

23. The method of claim 16 wherein the laminate has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

24. The method of claim 16 wherein the film is about 50 microns to about 75 microns thick.

25. The method of claim 16 wherein the film comprises a polyurethane, a polyvinylchloride, a polyester, an unsaturated polyester or an acrylic polymer or copolymer.

26. The method of claim 16 wherein the film comprises an acrylic film.

27. A method for making a fluorescent red article comprising the steps:

a. preparing a fluorescent red composition according to claim 1;

b. applying the composition to a first side of a film to form a coating thereon; and c. affixing the coated first side of the film to a substrate to form a laminate.

28. The method of claim 27 wherein the substrate is retroreflective.

29. The method of claim 27 wherein the laminate has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

30. The method of claim 27 wherein the substrate has an adhesive layer and the coated film is applied to the adhesive to form a laminate.

31. The method of claim 27 wherein the film comprises a polyurethane, a polyvinylchloride, a polyester, an unsaturated polyester or an acrylic polymer or copolymer.

32. The method of claim 27 wherein the composition is applied to the film as indicia.

33. The method of claim 27 wherein the substrate is a retroreflective substrate.

34. The method of claim 27 wherein the substrate is a polycarbonate film or a polymethylmethacrylate film and the coated film is laminated to the polycarbonate film or polymethylmethacrylate film with heat and pressure.

35. The method of claim 27 wherein the film comprises an acrylic film.

36. A method of claim 27 wherein the film comprises a thermoplastic film.

* * * * *